United States Patent
Chander

(10) Patent No.: US 10,719,304 B2
(45) Date of Patent: Jul. 21, 2020

(54) COMPUTER PROGRAM GENERATION USING A LIBRARY

(71) Applicant: FUJITSU LIMITED, Kawasaki-shi, Kanagawa (JP)

(72) Inventor: Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/194,224

(22) Filed: Nov. 16, 2018

(65) Prior Publication Data
US 2020/0159510 A1    May 21, 2020

(51) Int. Cl.
*G06F 9/44* (2018.01)
*G06F 8/54* (2018.01)
*G06F 8/36* (2018.01)
*G06F 8/41* (2018.01)
*G06F 9/445* (2018.01)

(52) U.S. Cl.
CPC .............. *G06F 8/54* (2013.01); *G06F 8/36* (2013.01); *G06F 8/433* (2013.01); *G06F 9/44521* (2013.01)

(58) Field of Classification Search
CPC .............. G06F 8/54; G06F 8/60; G06F 8/61
USPC ................................................ 717/160–165
See application file for complete search history.

(56) References Cited

U.S. PATENT DOCUMENTS

| | | | | |
|---|---|---|---|---|
| 5,519,866 A * | 5/1996 | Lawrence | ......... | G06F 8/48 717/162 |
| 5,613,122 A * | 3/1997 | Burnard | ......... | G06F 9/454 713/1 |
| 5,652,884 A * | 7/1997 | Palevich | ......... | G06F 9/454 713/1 |
| 5,797,014 A * | 8/1998 | Gheith | ......... | G06F 8/41 717/163 |
| 5,915,252 A * | 6/1999 | Misheski | ......... | G06F 9/449 |
| 6,199,049 B1 * | 3/2001 | Conde | ......... | G06Q 20/20 705/16 |

(Continued)

OTHER PUBLICATIONS

Kollner et al, "Designing a graphical domain-specific modelling language targeting a filter-based data analysis framework", IEEE, pp. 152-157 (Year: 2010).*

(Continued)

*Primary Examiner* — Anil Khatri
(74) *Attorney, Agent, or Firm* — Maschoff Brennan

(57) ABSTRACT

A method of generating computer-readable code may include receiving multiple user functions as designated by a user. The method may also include, for each of the user functions, locating at least one library associated with a given user function within a domain interface file (DIF), where the at least one library identifies a constructor of the given user function. The method may additionally include, based on the constructor, identifying one or more constructor libraries in the DIF that include functions that yield the constructor when executed. The method may additionally include retrieving code from the libraries associated with the user functions and the one or more constructor libraries that include functions that yield the constructor when executed. The method may also include combining the retrieved code into a single program, and providing the single program such that the single program is accessible by an end-user different from the user.

20 Claims, 5 Drawing Sheets

(56) References Cited

U.S. PATENT DOCUMENTS

| | | | |
|---|---|---|---|
| 6,199,068 B1* | 3/2001 | Carpenter | G01D 4/004 |
| 6,275,828 B1* | 8/2001 | Lee | G06F 9/4493 |
| | | | 717/116 |
| 6,604,110 B1 | 8/2003 | Savage et al. | |
| 6,681,383 B1 | 1/2004 | Pastor et al. | |
| 6,751,790 B2* | 6/2004 | Sokolov | G06F 9/4488 |
| | | | 717/148 |
| 6,918,126 B1* | 7/2005 | Blais | G06F 9/4488 |
| | | | 719/332 |
| 6,970,875 B1* | 11/2005 | Dey | G06F 30/327 |
| | | | 717/163 |
| 7,117,504 B2* | 10/2006 | Smith | G06F 8/20 |
| | | | 719/328 |
| 7,131,120 B2* | 10/2006 | Veselov | G06F 9/52 |
| | | | 717/164 |
| 7,752,606 B2 | 7/2010 | Savage | |
| 7,996,368 B1* | 8/2011 | Nalder | G06F 13/102 |
| | | | 707/673 |
| 8,572,591 B2* | 10/2013 | Cwalina | G06F 8/447 |
| | | | 717/147 |
| 9,239,774 B2* | 1/2016 | Paveza | G06F 11/362 |
| 9,424,005 B1* | 8/2016 | Avadhanula | G06F 8/35 |

OTHER PUBLICATIONS

Villazon et al, "Aspect Weaving in Standard Java Class Libraries", ACM, pp. 159-168 (Year: 2008).*

Martin et al, "Template Constructors for Reusable Object Initialization", ACM, pp. 43-52 (Year: 2013).*

Korson et al, "Technical criteria for the specification and evaluation of object-oriented libraries", Soft Engineering Journal, pp. 85-94 (Year: 1992).*

Baldonado et al, "An Extensible Constructor Tool for the Rapid, Interactive Design of Query Synthesizers" ACM, pp. 19-28 (Year: 1998).*

Katsuragawa et al, "Maintaining Third-Party Libraries through Domain-Specific Category Recommendations", ACM, pp. 2-9 (Year: 2018).*

Saito et al, "Self Type Constructors", ACM, pp. 263-282 (Year: 2009).*

Koh et al, "Domain Knowledge Driven FRBR Cataluging for the Future Libraries", IEEE, pp. 49-52 (Year: 2018).*

Xcode Interface Builder, Apple. retrieved from https://developer.apple.com/xcode/interface-builder/ on Nov. 20, 2018.

Wix.com, Website Builder. retrieved http://www.wix.com/ on Nov. 20, 2018.

React.js, A Javascript library for building user interfaces, retried from https://facebook.github.io/react/ on Nov. 20, 2018.

* cited by examiner

COMPUTER PROGRAM GENERATION USING A LIBRARY

FIELD

The embodiments discussed in the present disclosure are related to computer program generation.

BACKGROUND

With the proliferation of computers, there has also arisen a variety of approaches for generating computer-readable instructions for operating computers. However, such instructions often require detailed knowledge of a computer programming language and manually entering a variety of instructions for the computer to execute.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method of generating computer-readable code. The method may include receiving multiple user functions as designated by a user. The method may also include, for each of the user functions, locating at least one library associated with a given user function within a domain interface file (DIF), where the at least one library identifies a constructor of the given user function. The method may additionally include, based on the constructor, identifying one or more constructor libraries in the DIF that include functions that yield the constructor when executed. The method may additionally include retrieving code from the libraries associated with the user functions and the one or more constructor libraries that include functions that yield the constructor when executed. The method may also include combining the retrieved code into a single program, and providing the single program such that the single program is accessible by an end-user different from the user.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
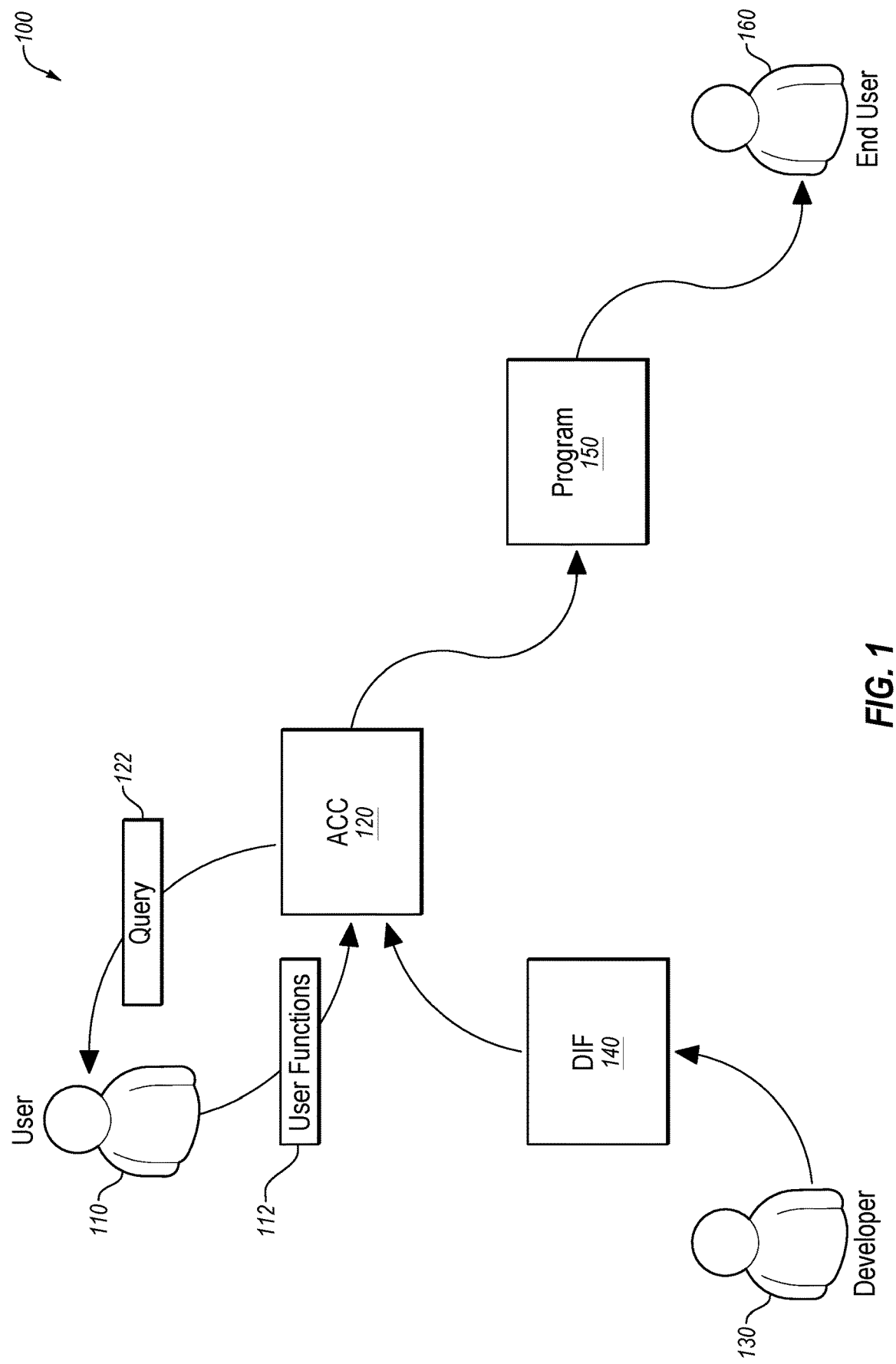
FIG. 1 illustrates an example system related to generating a computer program.

The present disclosure relates to, inter alia, the use of an automated code construction (ACC) system to generate a program when the user requesting the generation of a program may have limited knowledge of computer programming. The ACC may receive one or more user functions from a user to convey what the user intends for the program to do. Additionally, the user may provide context information for the program, such as a data structure to be used in operation of the program. The ACC may utilize a domain interface file (DIF) to find libraries of functions that perform the tasks identified in the user functions. The DIF may include multiple libraries of functions, such as the user functions, such that the ACC may retrieve code from the DIF to combine into a single program.

After identifying libraries in the DIF associated with the user functions, the ACC may search for other libraries within the DIF that generate objects used by the user functions such that the objects used by the user functions may be initialized and/or otherwise determined prior to executing the user functions. In these and other embodiments, the DIF may include library links in one or more of the libraries that point the ACC to a particular library within the DIF. For example, a library for a first function in the DIF may include a library link to a second library such that the second library may be identified by the ACC as one that is to be included in the single program. The library link in the first library may point to the second library as one that generates an object used by a function in the first library, a user function, or some other function already identified by the ACC as one to be included in the single program.

The use of an ACC system that uses a DIF may provide a number of benefits to the operation of a computer itself. With respect to the computer itself, the use of the DIF in conjunction with the ACC avoids various programming errors in which functions are referenced but not properly loaded. For example, using the DIF, libraries associated with a function are identified and properly loaded into code for a program. As another example, the ACC performs the loading of various portions of code in a proper order rather than relying on a human to introduce all of the code. As an additional example, the use of the DIF in conjunction with the ACC may facilitate the selection of computationally efficient functions that consume less resources for the application such that the speed of the program may be improved. As a further example, the present disclosure allows a computer to perform tasks it could not previously perform, namely, by allowing a search for library functions to prevent hang-ups in automated program generation, where previously human intervention may have been required. Thus, embodiments of the present disclosure may improve the performance of a computer itself.

Embodiments of the present disclosure are explained with reference to the accompanying drawings.

FIG. 1 illustrates an example system 100 related to generating a computer program, in accordance with one or more embodiments of the present disclosure. As illustrated in FIG. 1, a user 110 may submit user functions 112 and/or other information to an automated code construction (ACC) system 120. The ACC may utilize a domain interface file (DIF) 140 generated by a developer 130 to generate a program 150 that may be utilized by an end user 150. In some embodiments, the ACC 120 may submit queries 122 to the user 110 to obtain additional information in generating the program 150.

The user 110 may include a person or individual with little or no programming experience required, although the user 110 may have such experience. The user 110 may convey the desired intent of what the program 150 is to accomplish to the ACC 120 via one or more high level user functions 112 or some representation of the functions 112. For example, the user 110 may submit a Tillable form to the ACC 120 and request that approval be automatically gathered for the form after it is filled out. In such an example, the user 110 need not have extensive programming experience, but rather submits a form and a request of what is to be done with the form. In these and other embodiments, the user functions 112 may be provided by the user 110 looking up in a table the user function 112 that corresponds to the desired effect (e.g., storing the information entered in the form=save( ), and seeking approval=approve( )). As another example, the ACC 120 may be configured to receive a plain-language request from the user 110 and convert the plain language request into the user functions 112. For example, the ACC 120 may perform a text searching operation by searching for text used in the user request within one or more known user functions 112.

The DIF 140 may include a set of computer-readable instructions arranged such that the DIF 140 includes indication of how one or more libraries of functions are related to other functions or tasks of an application. As used herein, the term library may refer to a set of precompiled routines that a given program can call upon such that various objects, routines, subroutines, etc. are initialized and available to be utilized when the code of the library is added to a program without having to manually enter the code for each individual function that may be used within the precompiled routines. In some embodiments, the DIF 140 may include links that indicate what libraries and/or what other functions in the DIF 140 may yield a given object when executed. For example, if the ACC 120 recognized that the user function 112 used an object person as a constructor to operate, the ACC 120 may look up in the DIF 140 for libraries with functions that yield an object person when executed. Additionally or alternatively, the DIF 140 may include a link to a particular library such that a particular instance of the object person may be used as multiple libraries may yield the object person. As used herein, the term "constructor" may refer to a computer programming object that is utilized as one of the arguments in a function in computer programming. For example, the function approval( ) may utilize the objects Target and Approver_List to perform the function, and the two objects are constructors of the function approval( ).

In some embodiments, the DIF 140 may include a link within an identified library to another library. For example, a function in a given library of the DIF 140 may include an identification of another library within the DIF 140 that produces a constructor or other object utilized by the given library when executed.

In some embodiments, the ACC 120 using the DIF 140 may identify multiple potential libraries and/or multiple potential constructors that may be utilized by a given function. In these and other embodiments, the ACC 120 may submit a query 122 to the user 110 to determine which of the potential libraries and/or potential constructors are to be used in the program 150. For example, the ACC 120 may determine that a given function in a library may utilize three potentially different constructors that are generated by three different libraries, depending on the context in which the program 150 is implemented. In such an example, the ACC 120 may submit the query 122 to the user 110 to determine which of the three constructors is intended for the program 150. Based on the response to the query 122, the ACC 120 may identify the appropriate constructor to be used in the program 150.

After the ACC 120 identifies a library in the DIF 140 as being related to a given function, the ACC 120 may add the code of the library to the program 150. The ACC 120 may then analyze another of the user functions 112 and/or a constructor of one or more of the user functions 112 and/or a constructor of an identified constructor or identified function to identify any additional code to be added to the program 150. For example, the ACC 120 may begin the analysis with an initial user function and the associated library may be located in the DIF 140 and the code of the library added to the program 150. The ACC 120 may next identify any constructors of the initial user function in the DIF 140 and their associated libraries and add the code from such libraries to the program 150. The ACC 120 may next identify any constructors of the constructors in the DIF 140 and their associated libraries and add the code to the program 150, etc. Such a process may be repeated for each of the user functions until all of the user functions and constructors have been identified and had associated code from an identified library added to the program 150.

In some embodiments, the various portions of identified libraries and the associated code may be added in an order such that various constructors are initialized and/or generated in an appropriate order. For example, if an identified function calls a constructor, the code to generate that constructor may be included in the program 150 before the function that calls the constructor.

In these and other embodiments, after the ACC 120 has analyzed each of the user functions and any associated constructors, constructors of constructors, etc., the generation of the program 150 may be considered to be complete. After the program 150 is completed, the program 150 may be made available to an end-user 160. For example, the user 110 may be a business person without a strong programming background and may work with the ACC 120 to generate the program 150 for the end users 160 that may access the program 150 via a web interface.

In some embodiments, the user 110 may provide context information to the ACC 120 to facilitate the generation of the program 150. Such context information may include a data structure or user interface that the program 150 utilizes (e.g., a fillable form), an environment in which the program 150 may operate, a set of target end users 160 who will use the program, relationships between entities such as the policy that the program 150 utilizes for the intended tasks (e.g., an approver list for various users on various tasks), etc. In some embodiments, the context information may inform the ACC 120 as to one or more libraries to be added to the program 150. Such libraries may be unrelated to one of the user functions 112 but related to the context information. In some embodiments, the ACC 120 may identify multiple libraries as associated with one of the user functions 112 or one of the constructors and the context information may allow the ACC 120 to exclude some of the libraries such that the query 122 to the user 110 may include fewer than all of the potential libraries identified.

The approach of generating a program as described with reference to FIG. 1 may be particularly beneficial in generating Internet-based applications for fillable forms and the processing and handling of such forms. For example, such a use-case scenario may provide a particular framework that may lend itself to the automated creation of the program 150 as a discrete number of tasks may be performed. However, because those tasks can operate on any of a variety of constructors, the use of the ACC 120 and the DIC 140, and the ability to query the user 110 to clarify various aspects of the program 150 (e.g., which of multiple constructors are to be used) may facilitate the creation of the program 150.

Modifications, additions, or omissions may be made to the system 100 without departing from the scope of the present disclosure. For example, the system 100 may include any number of components and/or users that may facilitate the generation of the program 150.

Example Program Generation

The following example utilizes example lines of programming code to illustrate the creation of an example program using an ACC that utilizes a DIF. The example will follow the creation of a program to utilize a fillable form to collect information regarding a request, determine a list of approvers that can approve the request, and sequentially email the list of approvers until approval or denial is obtained for the request.

The user initially sends a request to the ACC to generate such a program, where the request includes the fillable form and the user functions: save( ) (e.g., save the information entered into the form) and approve( ) (e.g., seek approval for the request).

The ACC has access to a DIF with the following entries:
Form:
save(f)
read(f)
Approval:
init: Target, Approver_List
Approver_List: [Entity]
Links:
    Approver_List←Policy
Person: Entity
KEY: Email
Community:
[Entity w: Relative_Title]
find_related (relative_title, Entity): Entity
Policy:
init: [(Condition: Function, Result: *)]
evaluate: Result Based on the user providing a fillable form, the Form library is loaded with the save(f) function. The program would thus include the Form library and the function below in the program
f=save( ) // to save the entered data As the function save( ) operates on the provided form to be filled out, no additional functions and/or libraries are added to the program for this user function.

The ACC may next analyze the approve( ) function. For example, the ACC may identify that the Approve library and associated functions below are to be added to the program. However, the ACC may recognize the function Approval uses the constructors Target and Approver_List as designated by the line init: Target, Approver_List of the DIF. The ACC may recognize that the Target is the data from the saved form because of the context (e.g., the user submitted a fillable form to be approved). The ACC may recognize that the Approver_List is a set of Entity objects. The ACC may recognize that the Community library may yield an Entity and that a Person is an Entity. However, without the Link: section of the DIF, the ACC may be unable to determine what libraries to utilize for the Relative_Title object for the find_related function. Because the DIF includes the Link: section, the ACC is instructed that to acquire the Approver_List object, the Policy library is to be invoked.

In response to the Link: section of the DIF referencing the Policy library, the ACC recognizes that the constructor is a set of Condition: Functions, with an associated Result. The ACC may query the user for the Condition: Functions based on the object Condition not appearing elsewhere in the DIF. For example, when there is a constructor for an object (denoted by init), the object may be initialized before being used by other functions or performing other operations in the library, and where Condition does not appear elsewhere, the user may be queried as described above. Additionally or alternatively, the ACC may recognize that a call to Condition: Function invokes a query to the user to input a condition that takes the format of a function (e.g., >$500). The ACC may additionally recognize that meeting the Condition may yield some result. The use of the asterisk (*) in the DIF may trigger the ACC to query the user what result is intended by the user. In light of the context information, the ACC may query the user whether the result is to be Relative_Title, Person, or Community as these are the objects known to the ACC. In the present case, the user may respond by selecting Relative_Title. Stated another way, with their selections, the user may indicate that for requests of an amount over $500, a certain individual with a relative title must approve the request.

The ACC may next recognize that the find_related function in the Community library is the function to operate on the Relative_Title object to yield an Entity. In response to the identification of the find_related function in the Community library, the code from the Community library may be added to the single program. With the addition of the code from the Community library, the constructors for each of the user functions may be addressed and the program may be completed. The program may be compiled and provided to the end-user. An example of the code includes:
f=save( ) // saves the information entered in the form as the variable f
p=Policy.evaluate (f.amount) // performs the evaluate function from the Policy library, outputting a relative title based on the amount entered in the form
c=Community.find_related (p) // performs the find_related function from the Community library on the relative_title from the policy, outputting a list of entities that have the relative title
a=Approval (f, c) // executes the approval function on the form and the list of entities with the relative title by emailing each entity with the relative title the form until approval or denial for the request of the form is received For each of the methods illustrated in FIGS. 2-4, the methods may be performed by any suitable system, apparatus, or device. For example, any of the ACC 120 or the DIF 140 of FIG. 1, the user 110, the developer 130, and/or the end user 160, and/or any combination of elements of the system 100. Although illustrated with discrete blocks, the steps and operations associated with one or more of the blocks of the methods may be divided into additional blocks, combined into fewer blocks, or eliminated, depending on the desired implementation.

Figure 2:
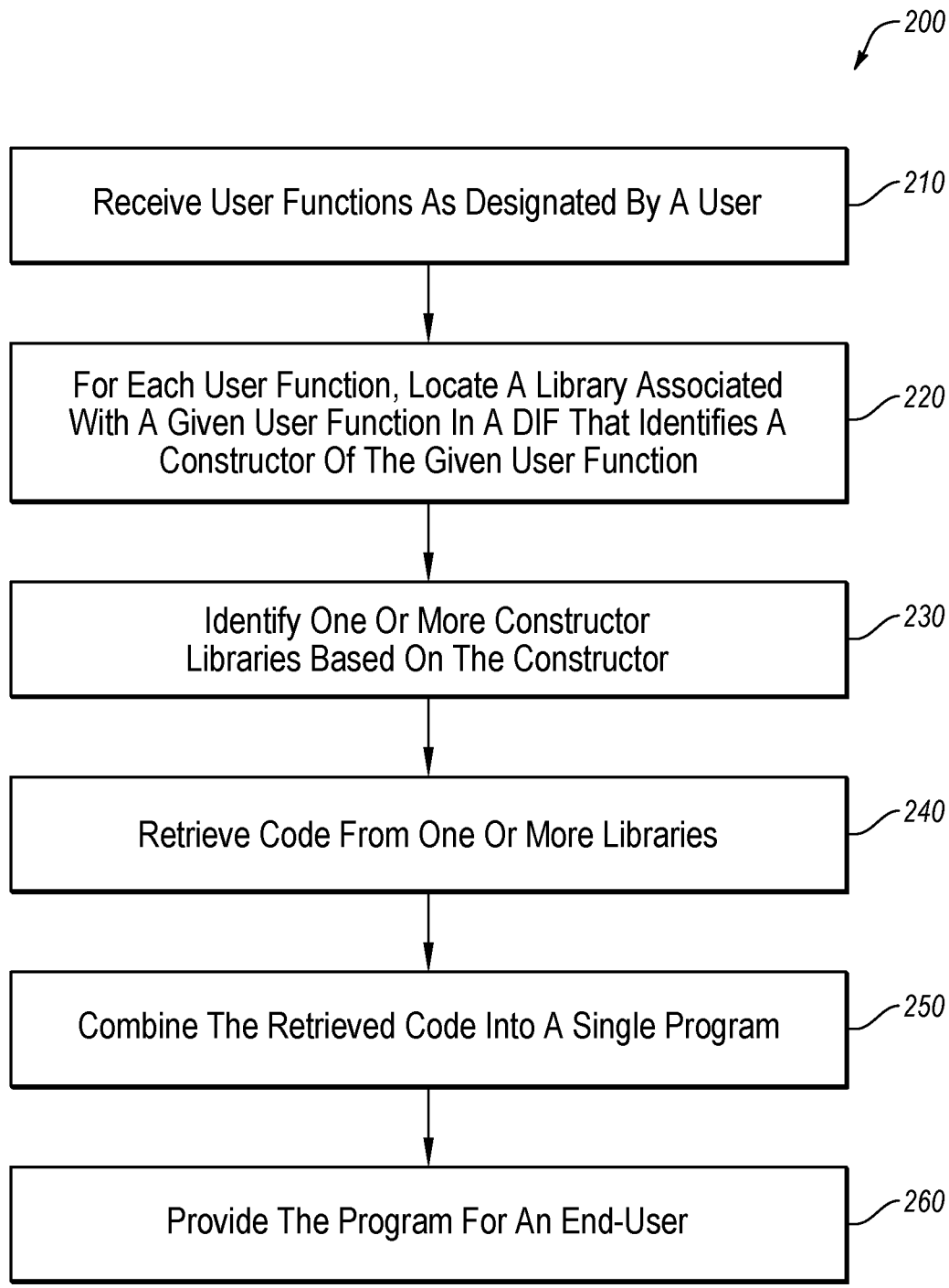
FIG. 2 illustrates a flowchart of an example method of generating a computer program.
Figure 3:
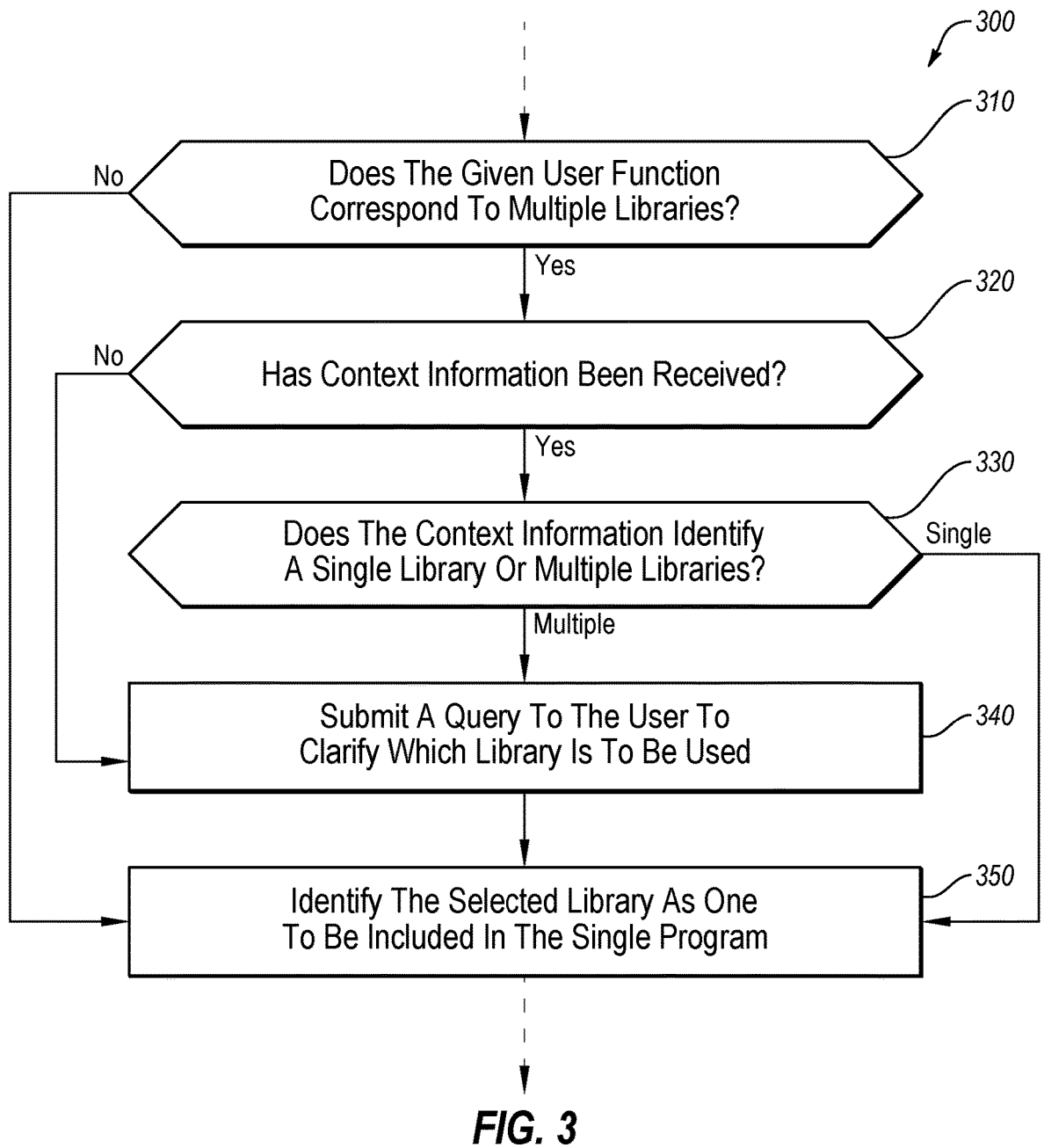
FIG. 3 illustrates a flowchart of an example method of further detail of various portions of the flowchart of FIG. 2, such as blocks 220 and/or 230.
Figure 4:
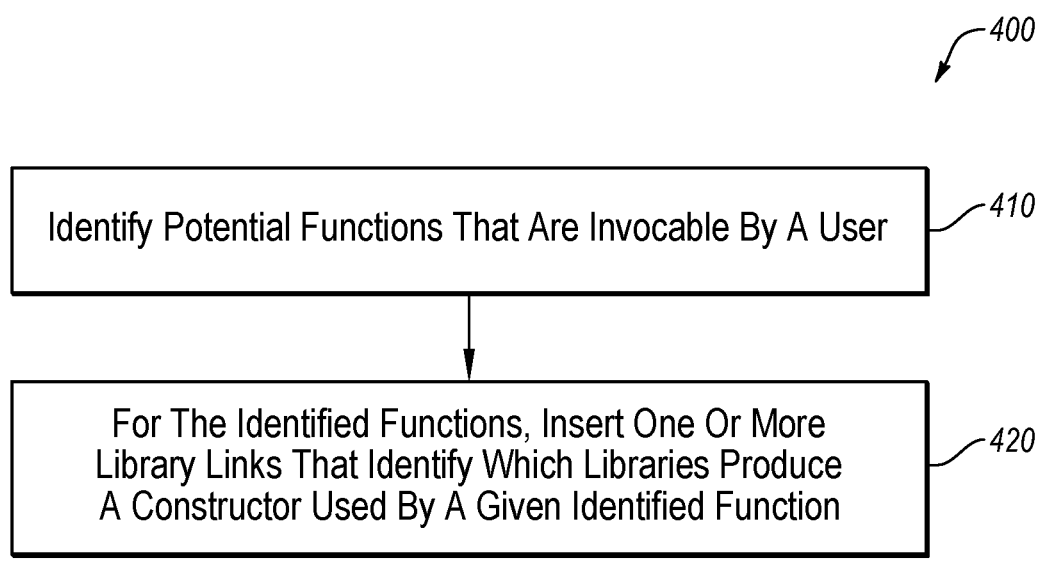
FIG. 4 illustrates a flowchart of an example method of generating a domain interface file (DIF)

Additionally, for each of the methods illustrated in FIGS. 2-4, modifications, additions, or omissions may be made to the methods without departing from the scope of the present disclosure. For example, the operations of the methods may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

FIG. 2 illustrates a flowchart of an example method 200 of generating a computer program, in accordance with one or more embodiments of the present disclosure. In some embodiments, the ACC 120 of FIG. 1 may perform one or more of the operations of the method 200.

At block 210, one or more user functions as designated by a user may be received. For example, an ACC may receive an input of one or more user functions from a user to be used by the ACC in the generation of a program for an end user. The user functions may be received as one or more high level functions entered textually, as an audio input, visual/graphical input (e.g., via block diagrams), etc. In some embodiments, the user functions may be conveyed as an intent of the user (e.g., by a statement of what the user desires the program for the end user to accomplish) and the ACC may parse the text of the statement to generate the one or more user functions. In these and other embodiments, the user may provide context information in addition to the one or more user functions. Such context information may include a context in which the program is to be used, or some information or feature to be used by the program. For example, the user may provide a form to be used to acquire data from an end-user during operation of the program, relations between different entities, etc.

At block 220, for each user function, a library may be located within a domain interface file (DIF) as being associated with a given user function. In these and other embodiments, the library may identify one or more constructors of the given user function. For example, for a first user function, a first library may be located in the DIF as being associated with the first user function, and for a second user function, a second library maybe located in the DIF as being associated with the second user function. The first library may identify one or more constructors used by the first user function and the second library may identify one or more constructors used by the second user function. In some embodiments, the first user function may be identified as being associated with the first user function based on the use of a same or similar term in the name of a function, a commented description of a function, etc.

In some embodiments, less than all of the functions may be associated with a corresponding library. For example, a user function may be input that includes enough detail from the user such that the user function may operate even without identification in the DIF. As another example, the context information from the user may provide enough detail to bypass the identification of a library for a give user function in the DIF. In these and other embodiments, the user may have experience with providing programming code such that the user may provide computer-readable code as one or more of the user functions.

In some embodiments, the one or more identified libraries may include a link to another library in the DIF. In these and other embodiments, the link may provide identification of another library or libraries that yield the constructor. In some embodiments, multiple libraries may be identified as potentially being utilized by the given user function. In these and other embodiments, a query may be submitted by the ACC to the user to provide information as to which of the multiple libraries is to be used.

At block 230, one or more constructor libraries may be identified in the DIF. For example, a library may be identified in the DIF that yields the constructor when executed. In these and other embodiments, a similar analysis as that performed for the user functions may be performed on the constructor such that any libraries that yield an object used by one of the user functions or a constructor may be identified.

At block 240, code may be retrieved from one or more libraries identified in the DIF. For example, the code of the libraries identified in the blocks 220 and/or 230 may be copied from the DIF in preparation of being included in a single program. As another example, the code from the libraries identified in the DIF may be stored in another location and/or accessed from another location.

At block 250, the retrieved code may be combined into a single program. For example, the code retrieved at block 240 may be compiled, appended or prepended, etc. to a growing set of code. In some embodiments, the blocks 220, 230, and/or 240 may be repeated multiple times until each of the user functions and or each of the constructors has had appropriate code included in a program. In some embodiments, the code from the libraries in the DIF may be combined in the program in a particular order based on the order in which the program may call the routines from the libraries. For example, the code may be included in the program in an order such that the constructors utilized by the given function are initialized and/or determined before the portion of the program corresponding to the given user function is executed. After all the code has been included, the program may be compiled or otherwise completed.

At block 250, the program may be provided to the ender user such that the end user may use the program to perform the desired tasks as indicated by the user functions of the user.

FIG. 3 illustrates a flowchart of an example method 300 of further detail of various portions of the flowchart of FIG. 2, such as blocks 220 and/or 230, in accordance with one or more embodiments of the present disclosure. For example, the method 300 may begin after the block 210 and after ending, proceed to one of the blocks 230 or 240.

The dashed arrow may indicate that the block 310 may begin after a previous block from FIG. 2, such as the block 210 and/or 220.

At block 310, a determination may be made whether a given user function corresponds to multiple libraries. For example, an ACC (such as the ACC 120 of FIG. 1) may determine whether or not the given user function appears in more than one library. As another example, the ACC may determine whether or not the given user function utilizes a constructor where multiple functions may generate the constructor. If the given user function does correspond to multiple libraries, the method 300 may proceed to the block 320. If the given user function does not correspond to multiple libraries, the method 300 may proceed to the block 350.

At block 320, a determination may be made whether or not context information has been received. For example, the user may submit the given user function and context information regarding the program. If context information has been received, the method 300 may proceed to the block 330. If context information has not been received, the method 300 may proceed to the block 340.

At block 330, a determination may be made whether the context information identifies a single library or multiple libraries. For example, the context information may indicate which of the multiple libraries are to be used in the program specifically enough that the single library is identified. As another example, the context information may provide enough detail to allow the ACC to prune one or more potential libraries without narrowing the potential libraries to the single library. If the context information identifies multiple libraries, the method 300 may proceed to the block 340. If the context information identifies a single library, the method 300 may proceed to the block 350.

At block 340, a query may be submitted to the user to clarify which library is to be used. For example, when arriving at the block 340 from the block 320, a query may be sent to the user regarding the multiple libraries identified at the block 310. The queries may include an identification of the libraries, the functions called by the libraries, constructors of the functions called by the libraries, etc. In some embodiments, the query may be presented as a question with multiple answers, each corresponding to a given library (whether by the name of the library, a function in the library, etc.). As another example, when arriving at the block 340 from the block 330, the set of libraries and/or functions presented to the user in the query may be limited or truncated based on the context information such that a smaller subset of potential libraries are presented to the user in the query.

At block 350, the selected library (or libraries) may be identified as a library to be included in the single program. For example, the single library identified by the context information (e.g., at block 330) or the library or libraries identified by the user in response to the queries (e.g., at block 340) may be identified as libraries that are to be included in the single program.

The dashed arrow after the block 350 may indicate that the method 300 may return to the method 200 of FIG. 2, such as the block 230 and/or 240. In some embodiments, the method 300 may be repeated for each user function and/or for each constructor of the user functions to identify the various libraries to be added to the single program.

FIG. 4 illustrates a flowchart of an example method 400 of generating a domain interface file (DIF), in accordance with one or more embodiments of the present disclosure. For example, a developer such as the developer 130 of FIG. 1 may utilize a computing system to perform one or more of the operations of FIG. 4 to generate a DIF.

At block 410, potential functions that are invocable by a user may be identified. For example, a developer may determine a scope of potential programs that may be generated using the DIF. Based on the scope of potential programs that may be generated, the developer may determine what functions may be used by the potential programs. For example, the functions may include user functions that may be submitted by a user in initially prompting an ACC to generate a given program, constructors of the user functions, or other functions that may be used by the ACC in generating the given program. In these and other embodiments, the functions identified by the developer may be an exhaustive set of functions that may be invoked during the operation of any program within the scope of the potential programs. In some embodiments, at least some of the functions identified by the developer may be organized into libraries and/or be added to or included in pre-constructed libraries.

At block 420, for the functions identified at block 410, one or more library links may be inserted that identify which libraries produce a constructor used by a given identified function. For example, the developer may insert a library link in a library such that as an ACC generating a program accesses a library associated with the given function, the library link located in that library points the ACC to another library that generates a constructor used by the function. Additionally or alternatively, the library link may point the ACC to a library that generates an object used by one or more of the constructors of the given identified function. The library links may be determined based on an expected potential use of a program such that the ACC may be pointed to additional libraries from within the DIF.

Figure 5:
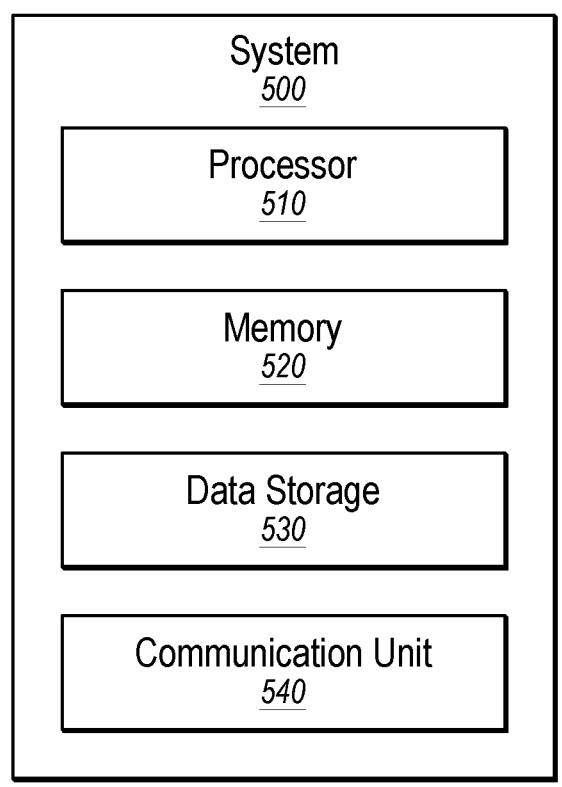
FIG. 5 illustrates an example computing system.

FIG. 5 illustrates an example computing system, according to at least one embodiment described in the present disclosure. The system 500 may include any suitable system, apparatus, or device configured to participate in the generation of a computer program. The computing system 500 may include a processor 510, a memory 520, a data storage 530, and a communication unit 540, which all may be communicatively coupled. The data storage 530 may include various types of data, such as computer-readable instructions to execute an ARC, a DIF, and/or one or more computer program libraries.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 550 may execute the program instructions, such as instructions to perform the methods 200, 300, and/or 400 of FIGS. 2, 3, and 4, respectively. For example, the processor 510 may obtain instructions regarding operating an ACC that utilizes a DIF to obtain user-designated functions and construct a single program that utilizes multiple libraries.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of generating computer-readable code, the method comprising:
   receiving a plurality of user functions as designated by a user;
   for each of the user functions, locating at least one library associated with a given user function within a domain interface file, the at least one library identifying a constructor of the given user function,
   the constructor including a computer programming object utilized as one of the arguments in the given user function;
   based on the constructor, identifying one or more constructor libraries in the domain interface file that include functions that yield the constructor when executed;
   retrieving code from the libraries associated with the user functions and the one or more constructor libraries that include functions that yield the constructor when executed;
   combining the retrieved code into a single program; and
   providing the single program such that the single program is accessible by an end-user different from the user;
   based on a response from the user identifying a given library, identifying the given library as one of the libraries for which code is to be retrieved and combined into the single program.

2. The method of claim 1, further comprising:
   identifying that the given user function corresponds to a plurality of libraries;
   submitting a query to the user to clarify which of the plurality of libraries is to be included in the single program.

3. The method of claim 1, further comprising:
   receiving contextual information from the user; and
   identifying that the given user function corresponds to a plurality of libraries; and
   based on the contextual information from the user, performing one of:
   identifying a given library as one of the libraries for which code is to be retrieved and combined into the single program; or
   submitting a query to the user to clarify which of a subset of the plurality of libraries is to be included in the single program, the subset determined based on the contextual information from the user.

4. The method of claim 3, wherein the context information includes a data structure provided by the user to be used in the single program.

5. The method of claim 4, wherein the data structure includes a fillable form.

6. The method of claim 1, further comprising compiling the domain interface file by performing operations comprising:
   identifying a plurality of potential functions that are invocable by the user, each of the potential functions associated with features of one or more given libraries, the association including identification of at least one additional function used by the given libraries; and
   for a given potential function that is invocable by the user, inserting one or more library links that identifies which library produces a given constructor called by the given potential function.

7. The method of claim 1, wherein the single program is a web-based program.

8. The method of claim 1, further comprising generating a user interface to be presented to the user via which the user inputs the user functions.

9. One or more non-transitory computer readable media containing instructions that, when executed by one or more processors, cause a system to perform operations, the operations comprising:
   receiving a plurality of user functions as designated by a user;
   for each of the user functions, locating at least one library associated with a given user function within a domain interface file, the at least one library identifying a constructor of the given user function,
   the constructor including a computer programming object utilized as one of the arguments in the given user function;
   based on the constructor, identifying one or more constructor libraries in the domain interface file that include functions that yield the constructor when executed;
   retrieving code from the libraries associated with the user functions and the one or more constructor libraries that include functions that yield the constructor when executed;
   combining the retrieved code into a single program; and
   providing the single program such that the single program is accessible by an end-user different from the user;
   based on a response from the user identifying a given library, identifying the given library as one of the libraries for which code is to be retrieved and combined into the single program.

10. The computer-readable media of claim 9, the operations further comprising:
    identifying that the given user function corresponds to a plurality of libraries;
    submitting a query to the user to clarify which of the plurality of libraries is to be included in the single program.

11. The computer-readable media of claim 9, the operations further comprising:
    receiving contextual information from the user; and
    identifying that the given user function corresponds to a plurality of libraries; and
    based on the contextual information from the user, performing one of:
    identifying a given library as one of the libraries for which code is to be retrieved and combined into the single program; or
    submitting a query to the user to clarify which of a subset of the plurality of libraries is to be included in the single program, the subset determined based on the contextual information from the user.

12. The computer-readable media of claim 11, wherein the context information includes a data structure provided by the user to be used in the single program.

13. The computer-readable media of claim 12, wherein the data structure includes a fillable form.

14. The computer-readable media of claim 9, the operations further comprising compiling the domain interface file by performing additional operations comprising:
- identifying a plurality of potential functions that are invocable by the user, each of the potential functions associated with features of one or more given libraries, the association including identification of at least one additional function used by the given libraries; and
- for a given potential function that is invocable by the user, inserting one or more library links that identifies which library produces a given constructor called by the given potential function.

15. A system comprising:
- one or more processors; and
- one or more non-transitory computer readable media containing instructions that, when executed by the one or more processors, cause the system to perform operations, the operations comprising:
  - receiving a plurality of user functions as designated by a user;
  - for each of the user functions, locating at least one library associated with a given user function within a domain interface file, the at least one library identifying a constructor of the given user function, the constructor including a computer programming object utilized as one of the arguments in the given user function;
  - based on the constructor, identifying one or more constructor libraries in the domain interface file that include functions that yield the constructor when executed;
  - retrieving code from the libraries associated with the user functions and the one or more constructor libraries that include functions that yield the constructor when executed;
  - combining the retrieved code into a single program; and
  - providing the single program such that the single program is accessible by an end-user different from the user.

16. The system of claim 15, the operations further comprising:
- identifying that the given user function corresponds to a plurality of libraries;
- submitting a query to the user to clarify which of the plurality of libraries is to be included in the single program; and
- based on a response from the user identifying a given library, identifying the given library as one of the libraries for which code is to be retrieved and combined into the single program.

17. The system of claim 15, the operations further comprising:
- receiving contextual information from the user; and
- identifying that the given user function corresponds to a plurality of libraries; and
- based on the contextual information from the user, performing one of:
- identifying a given library as one of the libraries for which code is to be retrieved and combined into the single program; or
- submitting a query to the user to clarify which of a subset of the plurality of libraries is to be included in the single program, the subset determined based on the contextual information from the user.

18. The system of claim 17, wherein the context information includes a fillable form provided by the user to be used in the single program.

19. The system of claim 15, the operations further comprising compiling the domain interface file by performing additional operations comprising:
- identifying a plurality of potential functions that are invocable by the user, each of the potential functions associated with features of one or more given libraries, the association including identification of at least one additional function used by the given libraries; and
- for a given function that is invocable by the user, inserting one or more library links that identifies which library produces a given constructor called by the given function.

20. The system of claim 15, the operations further comprising generating a user interface to be presented to the user via which the user inputs the user functions.

* * * * *